Dec. 7, 1954     E. G. GRIFFITH     2,696,316
BOX EMPTYING MECHANISM

Filed April 19, 1948     3 Sheets-Sheet 1

INVENTOR,
Earl G. Griffith
BY
ATTORNEY.

Dec. 7, 1954    E. G. GRIFFITH    2,696,316
BOX EMPTYING MECHANISM
Filed April 19, 1948    3 Sheets-Sheet 2
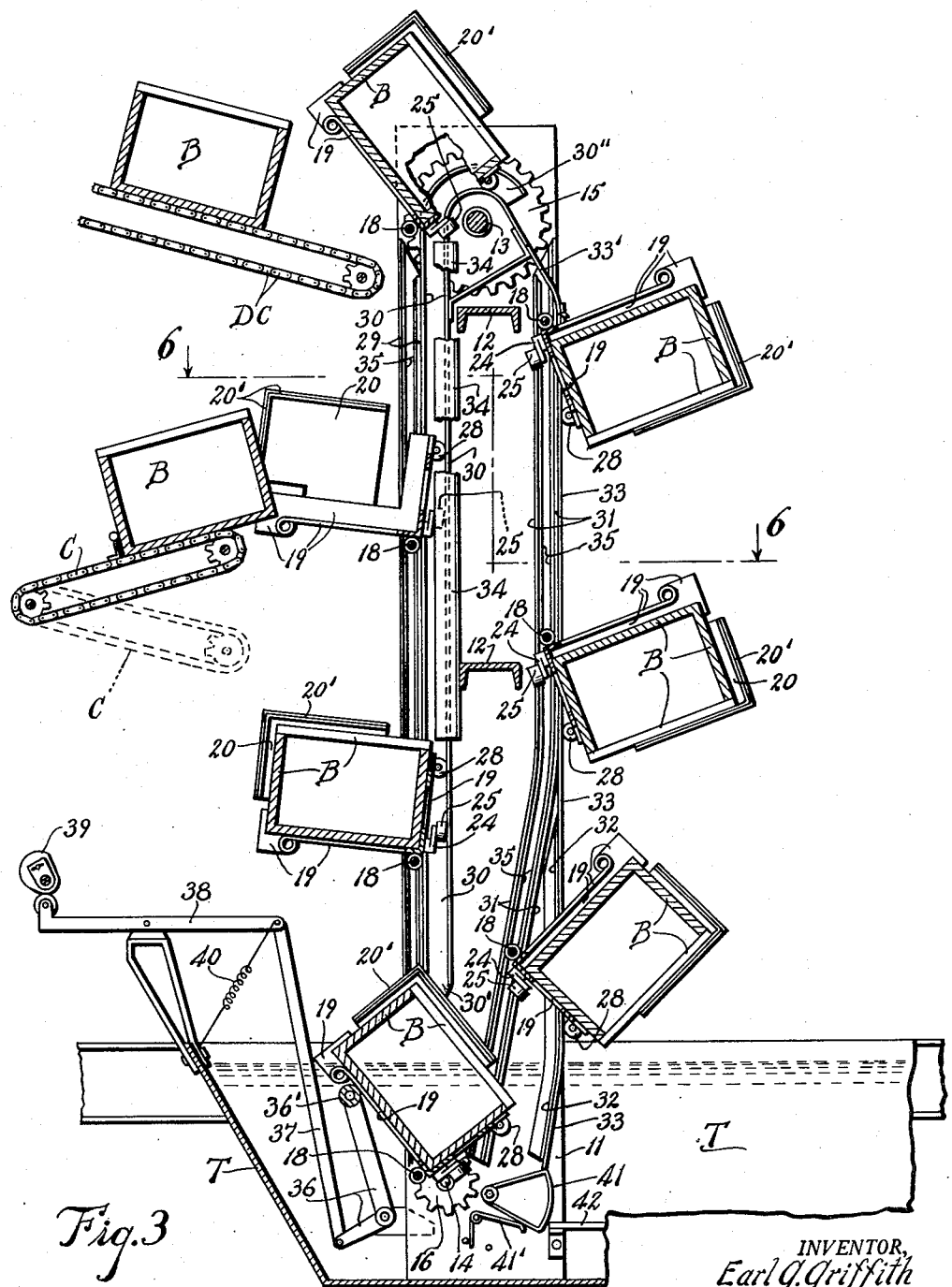
Fig.3
INVENTOR,
Earl G. Griffith
ATTORNEY.

Dec. 7, 1954  E. G. GRIFFITH  2,696,316
BOX EMPTYING MECHANISM
Filed April 19, 1948  3 Sheets-Sheet 3

INVENTOR,
Earl G. Griffith
BY
ATTORNEY.

2,696,316

Patented Dec. 7, 1954

2,696,316

BOX EMPTYING MECHANISM

Earl G. Griffith, Los Angeles, Calif.

Application April 19, 1948, Serial No. 21,783

1 Claim. (Cl. 214—311)

This invention relates to box emptying mechanisms, and more particularly to a mechanism designed to receive loaded boxes, one by one, convey them to a place of discharge, and for individually emptying the contents thereof in a gentle manner and so as not to injure the fruit, vegetables, or other things carried in said boxes.

The invention is particularly designed for thus handling boxes of fruit, vegetables and the like which are to be conveyed to a tank of water for washing and for gently dumping the contents into the water.

Among the salient objects of the invention are:

To provide a mechanism of the character referred to which includes an endless box carrier having means as a part thereof for receiving loaded boxes, one by one, with holding means for securing said boxes in said carriers during their travel to the dumping position, and afterwards releasing said boxes as they reach a discharge position, whereby said boxes are conveyed away for another load;

To provide in such a mechanism means for receiving and holding loaded boxes in an upright position, carrying them down into a tank of water, with tilting means automatically operated as the attached corner of the box carrier moves around the lower end of said endless carrier, for tilting said box carriers and said loaded boxes toward the upwardly moving side of said endless carrier to discharge the contents gently into the water as said box is moved upwardly in inverted position;

To provide in combination with an endless box carrying mechanism, guide members along the up and down sides of said endless conveyor for parts on said box carriers to move in for holding them in predetermined upright and inverted positions as they are moved with said endless conveyor around their course of travel;

To provide in combination with box carrier, holding wings or members with means for automatically opening and closing them at predetermined positions in the course of travel, for holding and releasing the boxes and for releasing them for discharge.

To provide in combination with an endless conveyor a plurality of box-carrying members, each including two spaced angle members, with pivotal means at the angle connecting it to said conveyor, whereby said two members extend away from said conveyor to receive loaded boxes; said box-carrying members being adapted to straddle a conveyor for receiving empty boxes as said box-carrier with an empty box thereon moves past said conveyor and discharges said empty box.

Other objects and advantages of the invention will be apparent from the following detailed description of one practical embodiment thereof, taken in connection with the accompanying three sheets of drawings, in which:

Figure 3 is a vertical sectional view taken on the line 3—3 of Fig. 1 with the sprocket chain omitted to more clearly show the arrangement of the rollers and guide ways therefor;

Figure 2:
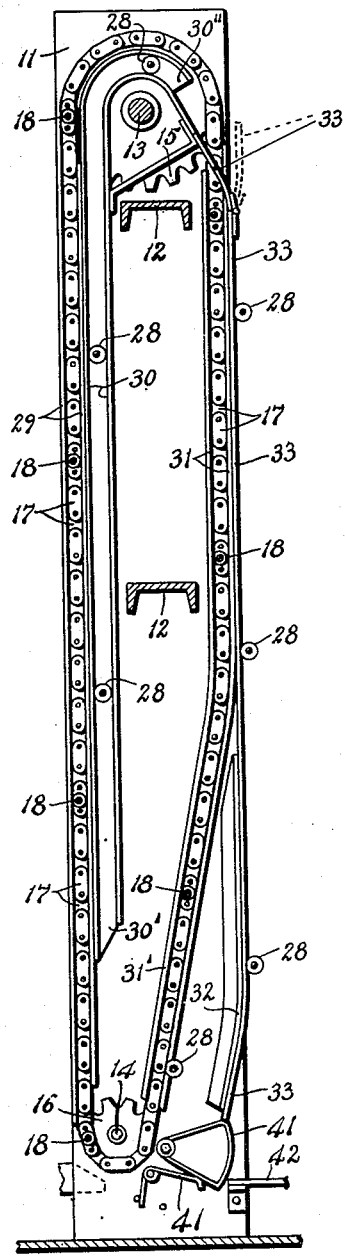
Figure 2 is a vertical sectional view taken on line 2—2 of Fig. 1, with parts omitted and shown in section.

Referring now in detail to the drawings, my supporting structure as here shown, includes two side members or plates, as 11, 11, connected by channel members, as 12, 12, welded or otherwise secured thereto at their opposite ends. At the upper and lower ends of said supporting structure are two cross shafts, 13 and 14, on the ends of which are sprocket wheels 15, 15, on shaft 13, and sprocket wheels 16, 16, on the lower shaft 14, over which two sprocket chains, as 17, 17, operate, as seen in Fig. 2, said sprocket chains having secured thereto, at intervals, carrying lugs or pins, as 18, 18, forming pivotal and carrying connections between said sprocket chains and the corners of box-carriers, designated 19. Said box-carriers are of angle form, or L-shaped, including two spaced members, connected at the angle to the two sprocket chains by the pivot pins or shafts, as at 18. Said box-carriers each have two holding wings, as 20, 20, at opposite sides, and each is attached at its lower edge to a tubular member 21, on a hinge shaft 22, held in place at its opposite ends in bearings 23, 23, said hinge shaft 22 having at one end a crank arm 24, with a roller 25 thereon for rocking or moving said holding wings in one direction, while a coiled spring 26 thereon moves said holding wings in closed position. Said holding wings each have a reinforcing member, as 27, secured thereto, and each has its top edge beveled or bent outwardly, as at 20', 20'. One of said box-carriers is best seen in section in Fig. 3, about to receive a box B, from a feeding conveyor C, not described as a part of this invention, but which moves downwardly to the position indicated in light broken lines during the delivery of a loaded box to a box-carrier.

Each of said box-carriers 19, in addition to its hinged connection at its lower corner to the sprocket chains, as at 18, 18, is provided on its upper attached end with rollers, as 28, 28, to move in guide ways or channels, hereinafter referred to.

Mounted in said vertical supporting structure at the receiving side thereof, at opposite sides and facing each other, are two channel guide members, 29, 29, extending from the upper sprocket wheel 15, to a position adjacent the lower sprocket wheel 16, Fig. 3, where the pivot connection is shown about to enter the sprocket wheel 16. It will be seen that the sprocket chain pins or shafts 18, 18, at the lower attached corners of the box-carrier members 19, move in these channels 29, 29, at the opposite sides of the structure, as they leave the upper sprocket wheel 15, and as they enter the lower sprocket wheel 16.

Figure 6:
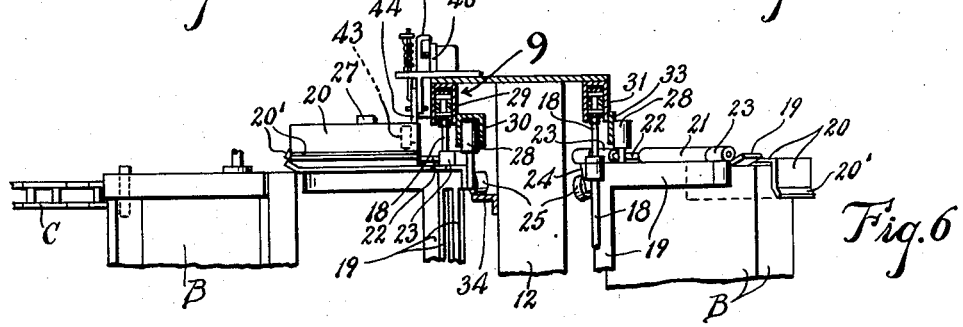
Figure 6 is a cross sectional view, taken on the irregular line 6—6 on Fig. 3, at one side, the opposite side being the same.
Figure 7:
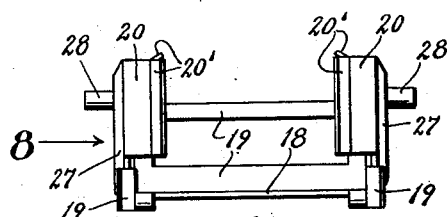
Figure 7 is a detail view showing one of the box holders or carriers with the holding wings in closed position.
Figure 8:
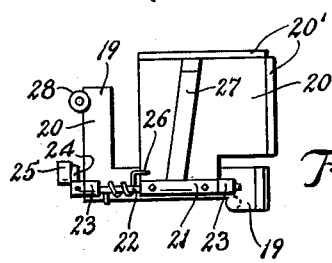
Figure 8 is a side view thereof, as seen from arrow 8, Fig. 7.

A second channel member 30, at each side of the vertical structure, hooks over the upper sprocket shaft 13, Fig. 3, and extends to a position just above the tank, designated T, as at 30'. These guide channel members 29 and 30, at one side are seen in section in Fig. 6, and in enlarged fragmentary views in Fig. 9.

Also mounted in said supporting structure, at the delivery side thereof, at opposite sides of said structure, are two channel members, designated 31, 31, and extending from sprocket wheels 15, 15, at the upper end of the structure, downwardly and inwardly, as at 31', to a position near the lower sprockets 16, 16, and in these channel members 31, 31, the pivotal members 18, 18, at the lower attached corners of the box-carriers move upwardly, after passing around the lower sprocket wheels 16, 16, as will be understood from Figs. 2 and 3. At the lower end of said structure, at the same opposite sides, are two shorted channel members, as 32, 32, on the rearward sides of which are two guide or bearing members, 33, 33, on the outer sides of which the rollers 28, 28, on said box carriers move, as seen in Figs. 2 and 3, after said box-carriers have passed around the lower end of the structure and are moving upwardly in inverted position, as seen in Fig. 3, also indicated in Fig. 2.

The upper ends of these guide or bearing members 33, have hinged ends, as at 33', 33', adapted to be raised to let the pivotal connections 18, 18, on the sprocket chains and the box-carriers pass to the sprockets after they reach the upper ends of the guide channels 31, after which said hinged ends close to allow the rollers 28, 28, to move over said hinged ends and into the entrance end 30'' of the guide channel members 30, 30. This mechanism holds and guides the box-carriers, with empty boxes therein, over the upper sprockets 15, 15, as clearly indicated in Fig. 3. It will be understood that said box-carriers have spaced sides, which are bridged by boxes thereon, and as these opposite sides move downwardly they straddle a discharge conveyor, designated DC, and the boxes are deposited on said conveyor and carried away for further use.

Figure 1:
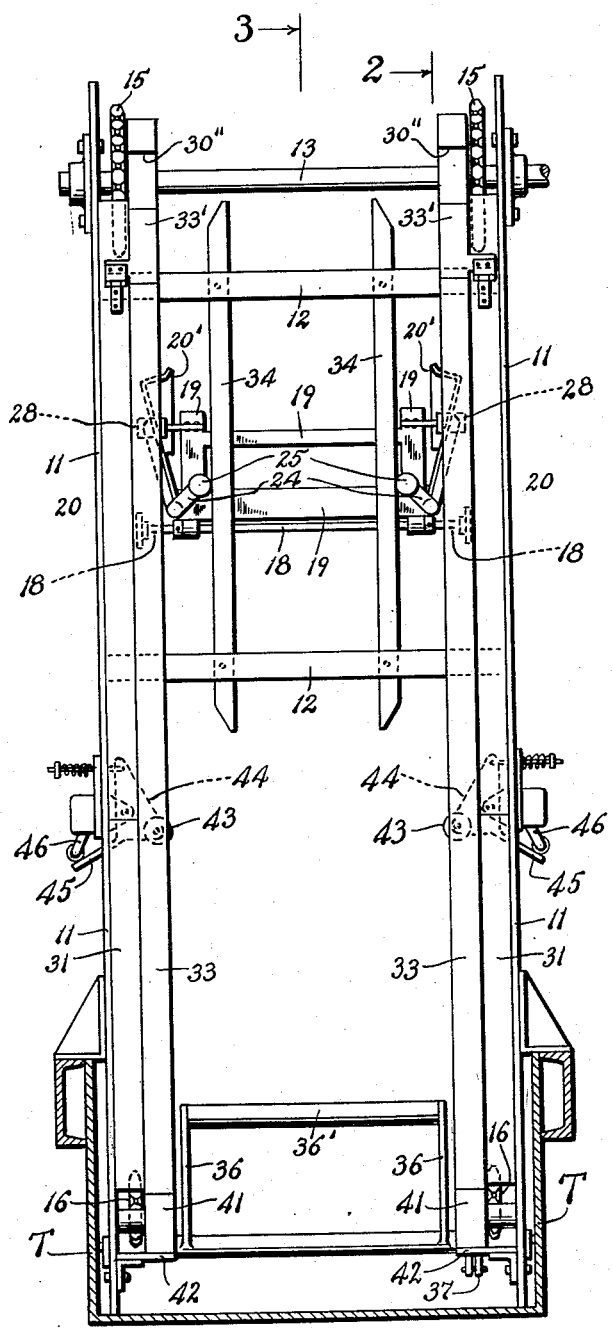
Figure 1 is a rear elevation of a box emptying mechanism embodying my invention, with parts omitted and shown in section.

Connected with the cross or connecting channel members 12, 12, of the frame structure, are two spaced guide bars or angle members 34, 34, positioned to act on the rollers 25, 25, on the cranks 24, 24, for moving the box holding wing members 20, 20, into open position as the box-carrier is moving along to the receiving position, and just prior to depositing a box at the upper end of the structure, on to the discharge conveyor DC. This action will be understood from the upper end of Fig. 3, and also on Fig. 1.

Figures 9, 10:
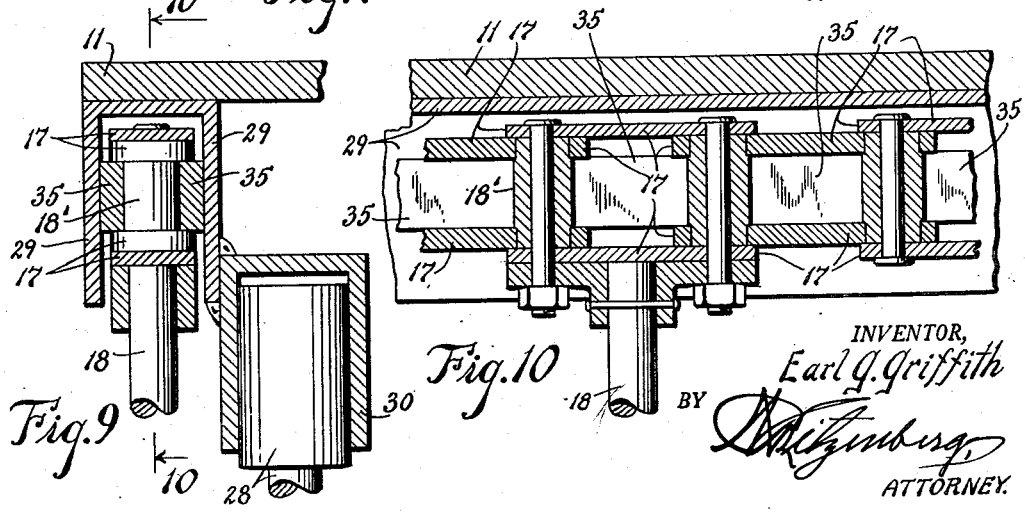
Figure 9 is an enlarged sectional view of parts shown in section in Fig. 6, at arrow 9.
Figure 10 is a fragmentary sectional view on line 10—10, Fig. 9.

Secured in the channel guide members 29, 29, in which the opposite ends of the sprocket chain pivot shafts 18', 18' move, are two spaced plates or members, as 35, 35, which fit between the opposite sides of the chains or links thereof, as seen in Fig. 9. These plates or members serve to prevent loose or lateral movement of said sprocket chains.

Figure 4:
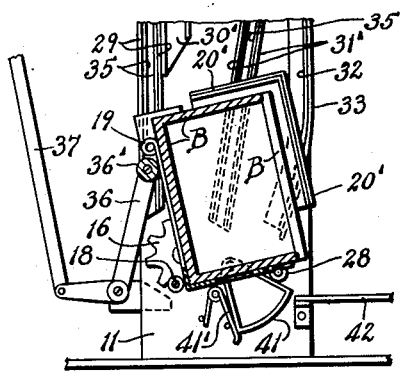
Figure 4 is a fragmentary view of the lower end of the conveyor mechanism, with a box in section in a carrier, as its attached corner is moving around the lower sprocket, with the mechanism for tilting the carrier and box toward the dumping position.
Figure 5:
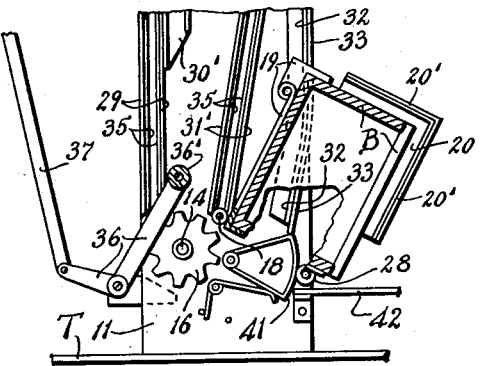
Figure 5 is a similar view showing the box-carrier with box therein in dumping position, and ready to start moving upwardly in tilted or inverted position.

Referring now to the lower ends of the conveyor, as seen in Figs. 3, 4 and 5, as the attached corner of the box-carrier, at 18, starts around the lower sprockets 16, 16, said box-carrier and box therein, are tilted toward the upwardly moving side of the conveyor, to the position shown in Figs. 4 and 5. This tilting mechanism includes two bell cranks, as 36, with rollers 36', operated through a link 37, from a pivoted arm 38, on the tank T, which is rocked by means of a revolving cam 39, as illustrated. This intermittently operates to push the upper end of a box-carrier with box therein, over, as is being done in Fig. 4, and as completed in Fig. 5, in which position the box discharges its contents into the water. The operating cam 39 is shaped to permit quick return of said tilting levers by means of a spring 40, Fig. 3.

Referring to the lower ends of Figs. 2 and 3, a spring held pivoted member 41, of triangular form, receives and guides the roller 28, on the upper corner of said box-carrier, under the lower end of the channel member 32, and guide plate 33, as seen in Fig. 4, whereupon said member 41 is raised to its normal position, as seen in Fig. 5, and acts as a guide for said roller up to the outer side of said guide plate or member 33. A member 42 is shown adjacent said pivot member 41, on to which said roller 28 can run a short distance as the pivotally connected corner of the box-carrier is starting upwardly in the guide channel 31', as clearly indicated in said Figs. 4 and 5.

As a safety device, in case something would cause the holding wings 20, 20, to remain open and not close together on a box on the box-carrier as the conveyor moves down, said holding wings would engage a roller 43, on a rocking member 44, having an arm 45, which engages and moves a switch lever 46 for the purpose of stopping the machine and preventing things to jam and causing damage. One of these safety devices is shown on each side of the structure so that either one of the holding wings, if open, would operate the switch lever 46 and open the switch, or cause the machine to stop.

Thus I have provided a practical box emptying mechanism to receive loaded boxes of fruit or the like, automatically delivered thereto, carry it down into a tank of water, automatically dump the contents into the water as the box-carrier and box is tilted over easily, so that the fruit floats out on the surface of the water, while the empty box is carried in an inverted position to the top of the conveyor and turned back to normal position, then released for delivery to a removing conveyor as the main conveyor moves in regular operation.

I am aware that changes in details of construction and arrangement can be made within the scope of the invention, and I do not, therefore, limit the invention to the showing made, except as I may be limited by the hereto appended claim forming a part of this application.

I claim:

In a box emptying mechanism the combination with a tank of liquid, of a vertical structure with sprocket wheels at its upper and lower ends and endless chains operating thereon, means for driving said chains, a series of box-carriers of L-form, each having its angle pivotally connected to said chains to move therewith, with the lower arm thereof projecting outwardly and upwardly from said chains and its vertical arm extended upwardly alongside of said chains, guide channels in said vertical structure, said box-carriers having box-clamping means thereon, and rollers thereon to move in said channels for holding said box-carriers in operative positions as they move around the course of said endless chains, tilting means adjacent said vertical structure, in said tank and automatically operated for engaging and tilting each box-carrier and its box from upright position to a partially inverted position to permit liquid to run into said box to float its contents out into said tank, said tilting means pushing each box over as its pivotally connected end moves around the lower end of said endless chains, whereby the contents of said box runs out as said box tilts over to an inverted position, said guide channels holding said box-carriers in inverted positions as they are moved upwardly on the opposite side of said vertical structure.

References Cited in the file of this patent

UNITED STATES PATENTS

| Number | Name | Date |
|---|---|---|
| 660,998 | Raymond | Oct. 30, 1900 |
| 799,477 | Levalley | Sept. 12, 1905 |
| 1,210,096 | Parker | Dec. 26, 1916 |
| 1,768,534 | Aiken | July 1, 1930 |
| 2,081,301 | Hudspeth | May 25, 1937 |
| 2,236,310 | Deal | Mar. 25, 1941 |
| 2,344,664 | Adams | Mar. 21, 1944 |
| 2,424,252 | Orlando | July 22, 1947 |
| 2,540,766 | Stilwell et al. | Feb. 6, 1951 |

FOREIGN PATENTS

| Number | Country | Date |
|---|---|---|
| 17,619 | Great Britain | Sept. 3, 1901 |